Nov. 26, 1963  O. L. PUCKETT  3,111,944
CHIROPRACTIC INSTRUMENT
Filed May 10, 1960  4 Sheets-Sheet 1
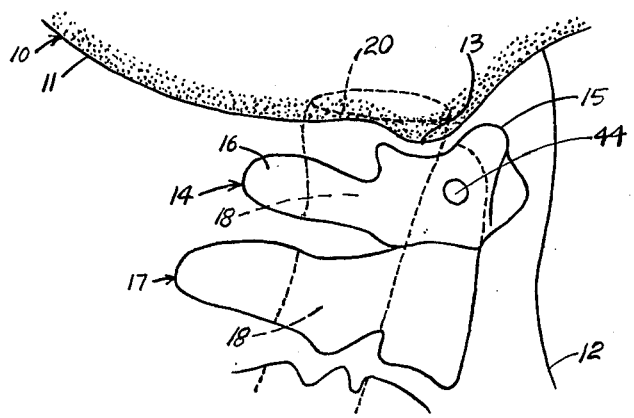
*Fig. 1*
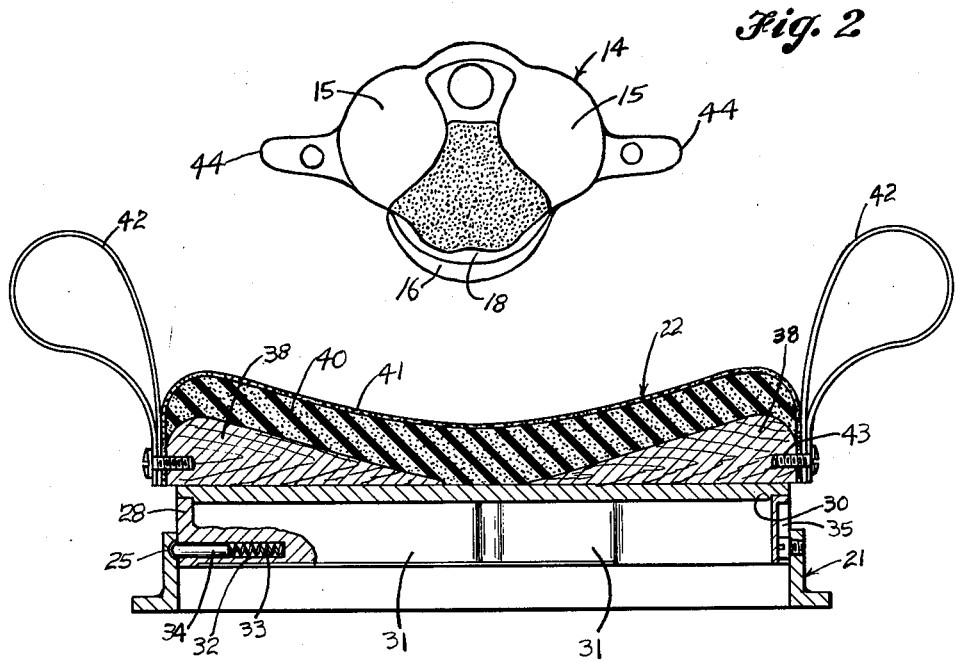
*Fig. 2*
*Fig. 3*
INVENTOR.
Dr. Orville L. Puckett
BY
Thomas W. Secrest
ATTORNEY Nov. 26, 1963   O. L. PUCKETT   3,111,944
CHIROPRACTIC INSTRUMENT
Filed May 10, 1960   4 Sheets-Sheet 2

INVENTOR.
Orville L. Puckett
BY
Thomas W. Secrest
ATTORNEY

Nov. 26, 1963 O. L. PUCKETT 3,111,944
CHIROPRACTIC INSTRUMENT
Filed May 10, 1960 4 Sheets-Sheet 3

INVENTOR.
DR. ORVILLE L. PUCKETT
BY
THOMAS W. SECREST
ATTORNEY

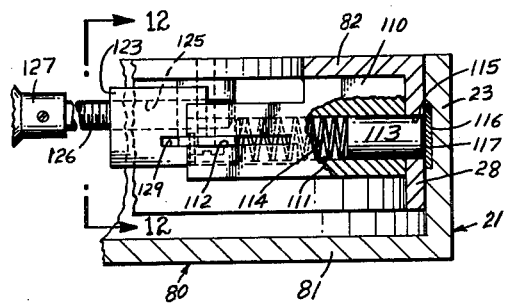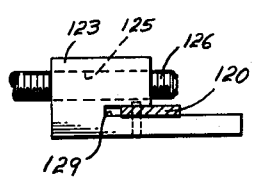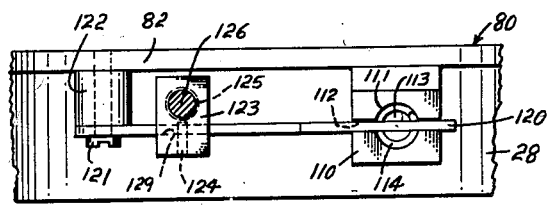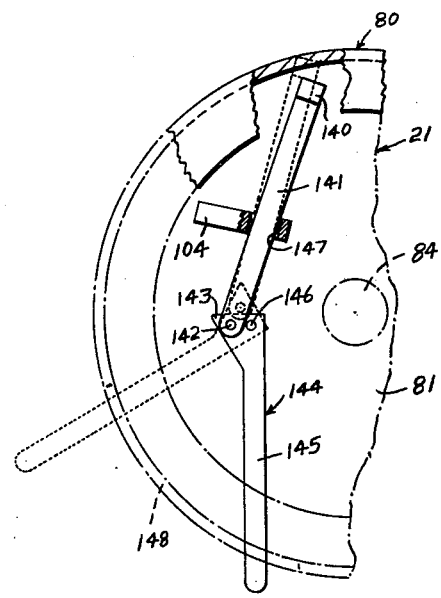

United States Patent Office 3,111,944
Patented Nov. 26, 1963

3,111,944
CHIROPRACTIC INSTRUMENT
Orville L. Puckett, 2225 E. Lake, Seattle 2, Wash.
Filed May 10, 1960, Ser. No. 28,163
5 Claims. (Cl. 128—69)

This invention relates to a chiropractic instrument and, more particularly, to such an instrument for use by chiropractors and osteopaths for seating the condyle with respect to the lateral mass of the atlas. This application is a continuation-in-part of co-pending application, Serial No. 677,405, filed on August 9, 1957, now abandoned, and which application in turn was a continuation-in-part of application, Serial No. 604,812, filed on August 17, 1956, now abandoned.

One of the causes of abnormal cord or brain pressures in the body is anteriority-superiority or anteriority-inferiority sub-luxations of the atlas. These sub-luxations are common to our society as they are caused by a whiplash type of accident, more particularly, the force outside the body strikes the body from a before-backward motion or from a behind-forward motion. These result in superior or inferior atlas whip-lash sub-luxations.

Prior to my presently-disclosed invention there was no direct approach to correct these sub-luxations. However, it is possible to slip the condyles forward on the lateral mass of the atlas. This, in effect, is the same as slipping the atlas backward on the condyles; or conversely, it is possible to slip the condyles forward on the lateral mass of the atlas. This, in effect, is the same as slipping the atlas backward on the condyles; or, conversely, it is possible to slip the condyles backward on the lateral masses which is the same as slipping the atlas forward on the condyles. In the instance where the medulla oblongata is being pinched by the improper seating of the condyles on the lateral masses of the atlas, the repositioning of the former with respect to the latter relieves this pinching action on the cord or brain stem and the resulting pressures in the body flowing therefrom.

An object of this invention is to provide an instrument for use in positioning the condyles with respect to lateral masses of the atlas.

Another object is the provision of an instrument which possesses means for controlling both the horizontal and the vertical movement of a headrest on the instrument.

An additional object is the provision of an instrument which is readily operable by a chiropractor.

An additional object is the provision of a method for correcting all directions of atlas sub-luxations simultaneously with a unidirectional thrust.

Another object is to provide an adjusting instrument which is relatively inexpensive to manufacture and can be used by an individual delivering a basic toggle-recoil delivery.

A still further object is to provide a mechanical means in the instrument for raising the headrest.

With yet additional objects and advantages in view which, with the foregoing, will appear and be understood in the course of the following description and claims, the invention consists in the novel construction and in the adaptation and combination of parts hereinafter described and claimed.

In the drawings:

FIGURE 1 is a fragmentary lateral view illustrating the position of the head with respect to the vertebrae in a human being;

FIGURE 2 is a plan view looking down on the atlas or the uppermost vertebra in a human being and illustrates this vertebra and position of the medulla therein;

FIGURE 3 is a longitudinal, vertical, cross-sectional view of a specific embodiment of the invention constructed in accordance with the preferred teachings thereof;

Figure 4:
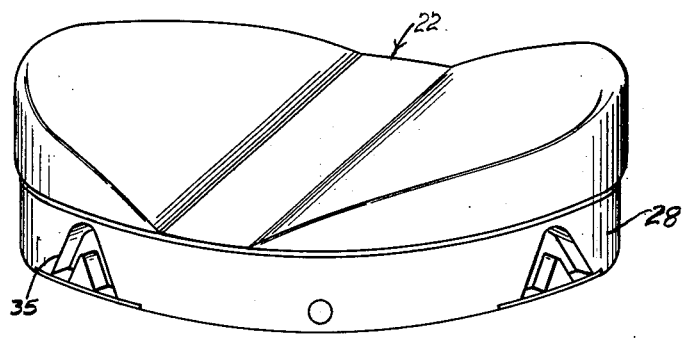
FIGURE 4 is a perspective view looking at the movable member of the invention and which member is referred to as a headrest.
Figure 5:
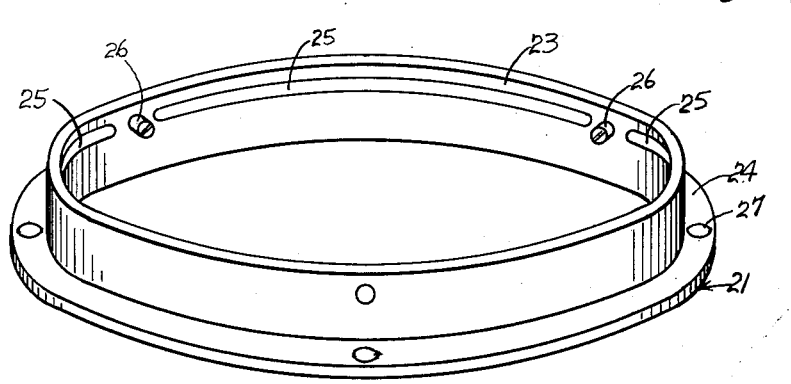
FIGURE 5 is a perspective view looking at the stationary member and illustrates elements for co-acting with the headrest.
Figure 6:
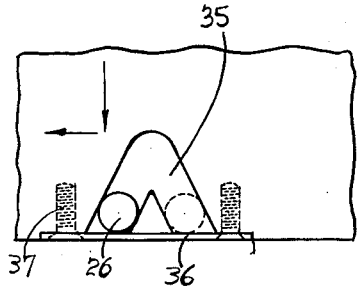
Figure 7:
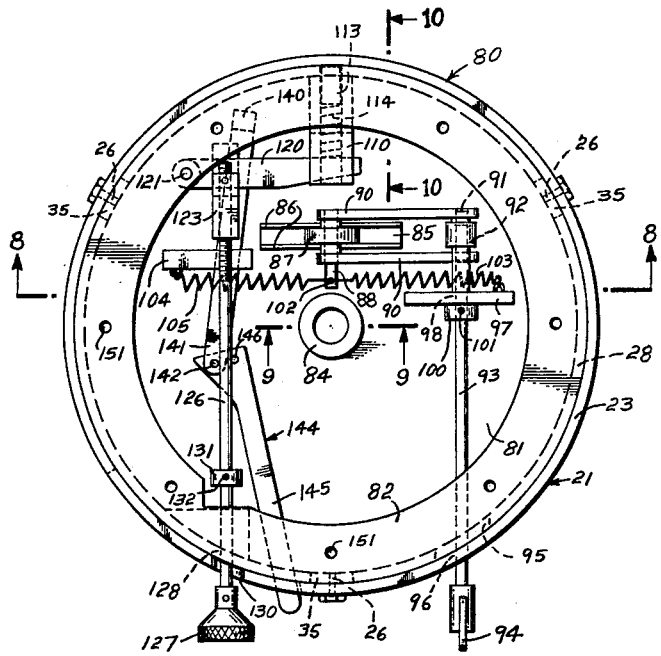
Figure 8:
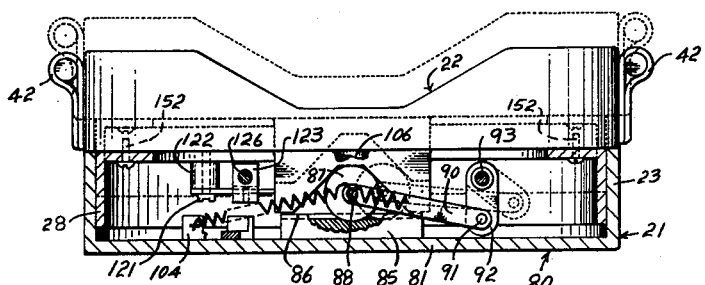
Figure 9:
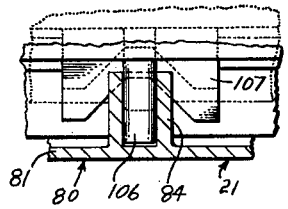

FIGURE 6, on an enlarged scale, is a fragmentary elevational view looking at the headrest and illustrates means for controlling both the horizontal movement and the vertical movement of said headrest;

FIGURE 7 is a top plan view of the instrument, with the headrest removed, and illustrates the elements for raising the headrest;

FIGURE 8 is a lateral vertical cross-sectional view taken on line 8—8 of FIGURE 7 and illustrates the arrangement of the elements for raising and lowering the headrest;

FIGURE 9 is a fragmentary vertical cross-sectional view taken on line 9—9 of FIGURE 7 and shows the center post of the headrest and, also, the cam;

FIGURE 10 is a fragmentary vertical cross-sectional view taken on line 10—10 of FIGURE 7 and illustrates the means by which the pressure to telescope the headrest into the base is varied;

FIGURE 11 is a fragmentary view of the socket used for moving a lever for controlling the pressure required to telescope the headrest into the base;

FIGURE 12 is a fragmentary vertical cross-sectional view taken on line 12—12 of FIGURE 10 and illustrates the socket and the lever for controlling the pressure required to telescope the headrest into the base; and FIGURE 13 is a fragmentary top plan view of the rim of the headrest and the base, and a lever and stop arrangement for restricting the movement of the headrest into the base member.

Prior to the discussion of the invention proper, there will be presented a brief outline of the structural relationship between the base of a human being's skull and the uppermost vertebra. Referring to FIGURE 1, reference numeral 10 denotes the skull of a human being with the occipital bone referred to by numeral 11. The jawbone is denoted by 12. The occipital bone near the uppermost vertebra forms the base structure referred to as the condyle 13. This condyle is positioned with respect to the upper vertebra or atlas 14 and, more particularly, with respect to the lateral mass 15 of the atlas. The lateral mass is on the upper and forward part of the atlas and projecting backwardly, and in a guard-like fashion on the atlas, is a posterior ring 16. The atlas 14, in turn, rests upon a vertebra 17 termed the axis. In the atlas and the axis is an opening or cavity 18 denoted by the broken lines on FIGURE 1. Returning now to the skull, at the base of the skull there is an aperture 20 termed the foramen magnum and through which aperture extends the medulla oblongata into the cavity 18. As is well-known, the medulla oblongata controls the automatic processes of the body such as breathing and the like.

The skull, the atlas and the axis are structurally connected not by a bone interfit but are connected by muscles and are held in place by these muscles. It is possible by means of a trauma, an accident or a concussion to vary the position of the condyle with respect to the lateral mass of the atlas so that the medulla oblongata is placed under pressure, thereby interfering with the transmission of nerve impulses between the brain and the body. This interference with the transmission of nerve impulses may cause pain and discomfort to the individual. For example, assume that the atlas has been moved forward of its normal position with respect to the condyle so that the back part or portion of the medulla is placed under pressure or shearing action by the posterior ring. By means of X-rays it is possible to determine if the condyle is seated properly upon the lateral mass. In this particular instance X-rays will show that the condyle is not seated properly upon the lateral mass and that it must be reseated in order for the patient to be comfortable. Therefore, the condyle is reseated properly on the atlas by manipulating the head with respect to the vertebra 14. I have discovered that this manipulation can be both controlled and performed in a better manner with the aid of my invention.

Turning to the invention it is seen that the same comprises essentially two members movable with respect to each other. One of these members is a base 21 and the other member is a headrest 22. The base 21 is essentially a cylinder 23 having a circumscribing flange 24 on the lower end. The cylinder 23 near the upper end has a groove 25 on the inside of the wall for receiving a later-to-be-identified element. This groove 25 does not completely inscribe the inner wall 23 but, instead, is in three separated portions. Each of these portions subtends an angle of approximately 100 degrees, and between two adjacent portions is an inwardly projecting stud 26. There are three studs in all. In the circumscribing flange 24 is a number of apertures 27 for receiving a bolt or the like so as to permanently position the base on a platform, medical table, or chiropractic table.

The headrest 22 is the movable portion and comprises a cylinder 28 having an outside diameter slightly less than the inside diameter of the cylinder 23 so as to be in a telescopic relation with said cylinder 23. In combination with this cylinder 28 is a cap 30 welded to the upper end of the same and three radial braces 31 welded both to the cap and to the inner walls of the cylinder. Drilled in the end of each of the radial braces 31 and the wall of the cylinder 28 is an opening 32 and in said opening is a spring 33 and a plunger 34. In assembled relation the plunger 34 projects outwardly into the groove 25 so as to give a friction fit between the inner cylinder 28 and the outer cylinder 23. This friction fit necessitates the application of pressure to move the inner cylinder into the outer cylinder. Also, at angles of substantially 120 degrees, or equiangularly spaced around the outer wall of the cylinder 28 are grooves 35. These grooves are in an inverted V configuration. The width of the grooves is slightly greater than the diameter of the stud 26 so as to receive the same when in an assembled position. In this assembled position the studs project into the grooves making it possible to move the headrest 22 both vertically and horizontally upon telescoping the headrest 22 into the base 21. From the center line of the inverted V to the center line of the groove in the presently employed instrument there is a distance of approximately one-fourth inch which controls the horizontal movement of the headrest and also the patient's head. Also, the maximum vertical travel of the headrest with respect to the base member is approximately one-half inch in the instrument I have constructed. In order to position and maintain the stud 26 in the groove 35 there is placed a keeper 36 over the lower end of the grooves or guide path. This keeper is retained in position by means of bolts 37 which are threaded into the tapped openings in the wall of the cylinder 28. The studs 26 in combination with the grooves 35 prevent 28 going all the way through the opening in 21.

As is seen from this description, the movable member 22 can be pulled outwardly with respect to the base 21 so that the plungers 34 co-fit in the grooves 25. These plungers hold these two members in this position until pressure is applied to move the headrest into the base so that the stud with respect to the grooves is moved from resting against the keeper 36 to the apex of the inverted V. This is more appropriately brought forth by referring to FIGURE 6. With this arrangement it is possible to rotate the headrest either in a clockwise or in a counter-clockwise motion upon telescoping the same into the base member. The choice of a counter-clockwise or clockwise motion is determined at the time the headrest is pulled outwardly on the base member. More particularly, upon pulling the headrest outwardly, a slight twisting motion of the same is imparted simultaneously with the pulling motion and this twisting motion is the determining factor of counter-clockwise or clockwise later-to-be-telescoped motion of the headrest 22 into the base 21.

Of value in understanding this motion of the headrest into the base, there is employed the $x$—$y$ axis of geometry. The moving of the headrest into the base may be considered to be the $y$-direction move and the rotational movement may be considered to be the $x$-direction movement. More particularly, due to cylindrical configurations of the headrest and the base, resort should be to the $x$—$y$—$z$ axis relationship. In this matter the telescoping movement of the two cylinders is the $y$-move and the rotational movement of the headrest is the $x$—$z$ move.

Forming part of the headrest 22 is that portion for receiving the head. This portion is not part of the mechanical features of the invention but, nevertheless, is important as it forms a pillow or a cushion for the patient's head. More particularly, there are fastened to the end plate 30 two inwardly sloping and approximately half-circular wooden blocks 38. These two blocks in combination define a saddle for receiving the head. Overlying each of these blocks is a layer of foam rubber 40 and overlying the foam rubber is a covering material such as leather or vinyl 41. Also, there are provided two straps 42 for lifting the headrest 22 outwardly from the base member 21. These straps are fastened to the blocks 38 by means of a screw 43.

Having presented the mechanical features and aspects of my invention, the same may be more explicitly advanced by the presentation of an example illustrating the use of the same. Assume that in a patient the atlas has been moved anterior and superior and to the right of the normal position of the condyle and the foramen magnum with respect to the lateral mass of the atlas. Or, that the atlas has moved forward and upward and slipped laterally to the right of the normal position of the condyle and foramen magnum in relation to the lateral mass of the atlas. This slippage or unseating causes interference with the normal transmission of the nerve impulses between the brain and the body because of the pressure on the medulla oblongata. By means of X-rays this unseating is determined. The treatment for this comprises the laying of the patient on his left side with the left side of his head on the headrest 22 and the neck or first vertebra, atlas, lying outside the periphery of this headrest. Prior to placing the patient's head on the headrest the headrest is pulled outwardly and rotated in a clockwise direction with respect to the base member 21. With the patient's head resting on the headrest the chiropractor presses his fingers down on the right transverse process 44 of the atlas and gives a quick thrust so as to rotate the headrest counter-clockwise and to move the head laterally to the right of the lateral mass of the atlas. Because of the controlled action of the headrest 22 with respect to the base member 21, a vertical movement limited to approximately one half inch and a counter-clockwise horizontal movement limited to approximately one quarter inch, the condyles are gently reseated on the lateral masses of the atlas. With the condyles reseated the pressure on the medulla oblongata is relieved so as to relieve the pain of the patient. In effect the lateral mass of the atlas has been moved from its forward position with respect to the condyles to the normal position and the head has been laterally moved to the right with respect to the lateral mass of the atlas so as to be in the normal position. Although only one example is presented, it is to be realized that many other examples starting with the displacement of the condyles with respect to the lateral mass of the atlas and the proper reseating of these can be presented; and, it is believed that this one example shows the value and usefulness of my invention.

In FIGURES 7 through 13 there is presented another chiropractic instrument 80 having means to raise and lower the headrest 22 other than by straps 42.

This chiropractic instrument has a base 21. The base 21 has cylindrical walls 23 as previously described and, also, a solid circular base member 81 integral with the bottom of the surrounding wall 23. Also, there is a headrest 22 similar or the same as the previously described headrest. This headrest is attached at its lower surface to a circular rim 82. This circular rim 82 is attached on its outer periphery with the previously described cylindrical wall 28. In the outer surface of the cylinder 28 is a previously described V-groove 35. Projecting inwardly through the cylindrical walls 23 of the base member 21 are studs 26. As previously stated, these studs 26 coact with the V-groove 35. The mechanical operation of the instrument 80 up to this point is the same as the operation of the previously described instruments with respect to the telescoping of the headrest member to the base member.

The means for moving the headrest outwardly with respect to the base 21 comprises a cylinder 84 attached to the upper surface of the base 81 of the base member 21. This cylinder is at the center of the base 21 and also may be considered to be centrally positioned with respect to the cylinder 28 of the headrest 22. Positioned in back of the cylinder 84 is a track member or a guide member having a base 85 and spaced-apart walls 86 and which walls function as a guide. In this track, there is run a wheel 87. The wheel 87 is journalled on a shaft 88. This shaft is positioned in a frame comprising spaced-apart frame members 90. The other end of the frame members 90 are connected by a shaft 91. Journalled on this shaft 91 is a lever arm 92. The lever arm is attached to a rotating shaft 93. Attached to the outer end of the rotating shaft 93 is a handle 94. The shaft 93 projects through a cut-away portion 95 in the cylindrical wall 23 and in the lined passageway 96 in the cylindrical wall 23. It is seen that the lever 92, the shaft 93 and the handle 94 are in effect a belt crank. On the upper surface of the bottom 81 is a lug 97 having a central passageway 98 and may be considered to be journalled therein. On this shaft is a stop member 100 having a set screw 101. It is seen that the position of the shaft 93, with respect to inward movement, is determined by the stop 100. In the inner end of the shaft 88 is a hole 102. A spring 103 is positioned between the hole 102 and the lug 97. Also, on the upper surface of the base 81 is a lug 104. The lug 97 is on one side of the cylinder 84 and the lug 104 is on the other side of the cylinder 84. A spring 105 runs between the lug 104 and the hole 102 in the shaft 88. It is seen that in effect, the springs 103 and 105 position the wheel 87 so it is approximately midway on the track 85.

Attached to the bottom of the headrest 22, and in the center thereof is a downwardly projecting stud 106. As is appreciated, this stud cofits with the cylinder 84 on the upper surface of 81. Also, on the bottom of the headrest 22 is a downwardly directed cam 107. This cam is positioned in back of the stud 106 and cofits with the wheel 87. The cam's surface of the cam 107 is in the configuration of a modified inverted V. In operation it is seen that with the movement of the wheel 87 on the guide 85 the cam 107 is raised and consequently the headrest 22 is raised. This is controlled by the handle 94 and the rotation of the shaft 93. It is possible to raise the headrest by moving the wheel 87, see FIGURE 7, either to the right or to the left. By moving the wheel 87 to the left, the headrest is both raised and rotated slightly counterclockwise and by moving the wheel 87 to the right, the headrest is both raised and rotated slightly clockwise.

It is desirable to be able to vary the resistance to the movement of the headrest 22 into the base 21. In other words, under certain circumstances, it may be desirable to use more force pushing the headrest into the base member. For example, one operator may require a great deal of resistance while another operator may require very little resistance. To provide this variable resistance there is a lug 110 attached to the circular rim 82 and underneath the same and positioned next to the cylindrical wall 28 of the headrest 22. In this lug there is a radial drilled passageway 111. The rearward or inward part of this lug has a longitudinal slot 112. It can be considered that the lug is forked at this particular region. In the passageway 111 is a plunger 113. A spring 114 is back of the plunger and urges the plunger outwardly. In the cylindrical wall 28 is a passageway 115 which is aligned with the passageway 111 and the lug 110. The cylindrical wall 23 of the base member is recessed at 116 to receive a bearing plate 117. As is realized, the spring 114 urges the plunger 113 through the passageway 115 and against the bearing plate 117.

To accomplish this there is provided a lever 120 for compressing the spring 111 so as to force outwardly the plunger 113. The outer end of the lever 120 is free to move. The inner end is pinned by pin 121. This pin is attached to the circular flange 82 and is spaced therefrom by a spacer 122. It is to be realized that the pin 121 may be a bolt or a rivet but, in effect, it acts as a pin. Between the pin 121 and the spring 113, there is a block 123. This block has a slot 129 which partially covers the block 123. The lever 120 is positioned in the slot 129. A pin 124 positions the lever 120 with respect to the block 123. Also in the block is a tapped hole 125. Screwed into the tapped hole 125 is a threaded shaft 126. This shaft extends to the front of the instrument and on its outer end has a knob 127 which is secured thereto by a set screw. It is to be realized that the shaft 126 extends through a drilled hole 128 and the cylindrical wall 28 and, also, that the cylindrical wall 23 is cut away at 130 so as to allow the shaft to be in this position. In FIGURE 7 it is seen that the shaft 93 is on the right of the cylinder 84 and the shaft 126 is on the left of said cylinder. Also, on the shaft 126 is a stop 131. This stop is secured on the shaft by means of set screw 132. The stop restricts the outward movement of the shaft so that the shaft 126 will not pull the lever 120 out of the slot 112 in the block 110.

In operation, it is seen that the knob 127 can be turned so that the lever 120 is forced into the slot 112. This forces the plunger 113 against the bearing plate 117 so as to make it more difficult to force the headrest 22 into the base 21. Conversely, the knob 127 can be rotated so that the lever 120 is pulled part-way out of the slot 112 so that the plunger 113 does not bear against the bearing plate 117 with such force. As a result, it is relatively easy to force the headrest 22 into the base member 21.

There is also provided a means for restricting the inward movement of the headrest with respect to the base 21. This means restricts the inward movement of the headrest. More particularly, see FIGURE 13, there is a block 140 on the end of lever 141. Briefly, with the headrest in the raised position, this block is moved under the cylindrical wall 28. In effect, the movement of the headrest is decreased by the height of the block 140 as the block prevents the full movement of the headrest into the base 21. The lever 141 is pinned at 142 to the leg of the lever 143. The leg 143 is one leg of the lever 144. The lever 144 also has a leg 145. The lever 144 is pinned at 146 to the base 81 of the base member. The lug 104, at its lower surface, has a cut-away portion 147. The lever 141 runs through this cut-away portion and, in effect, this part of the lug 104 acts as a guide for lever 141. Also, the cylindrical wall 23 of the base member 21 is cut away to form a groove 148. With reference to FIGURE 13, it is seen that with the arm 145 and the lever 144, in it farthest right position, the complete full line, the block 144 is not underneath the cylindrical wall 28. However, with the lever 145 rotated to the left as far as it can be rotated, see the broken lines, the block 140 is moved underneath the cylindrical wall 28 so as to restrict the inward movement of the headrest 22. It may be mentioned that the lever 144, in effect, is a bell crank lever or the equivalent of a bell crank lever.

The head receiving part of the headrest 22, viz., 38, 40 and 41, is attached to the circular flange 82. More particularly, with reference to FIGURE 7, it is seen that there are a number of drilled holes 151 in the circular flange 82. Screws 152 are screwed up through these holes and attached to the base of the headrest 22. From an assembly standpoint, there are accessible openings in the base 81 so as to attach the headrest 22 to the circular flange. These accessible openings are not illustrated but they are present in the actual headrest as used.

In FIGURES 8 and 9, there is illustrated the positions of the headrest 22 with respect to the base member 21. More particularly, the heavy solid line illustrates the headrest telescoped into the base member 21. And, the broken lines illustrate the headrest 22 as pulled outwardly from the base member 21. In FIGURE 9, there is illustrated the position of the cam 107. Again, the solid black line indicates the position of the cam when the headrest 22 is telescoped all the way into the base 21. The broken lines indicate the position of the cam when the headrest 22 is telescoped outwardly with respect to the base member 21.

Having described my invention and illustrated the same in a working relation, it is to be understood that my disclosure is to coved minor variations and equivalents such as a greater or less movement of the headrest with respect to the base member 21 and a greater or less rotation of said headrest to said base member.

What I claim is:

1. A medical instrument having a movable platform and a base, said movable platform having a first cylindrical member, said base having a second cylindrical member, the first cylindrical member having an outside diameter slightly less than the inside diameter of the second cylindrical member so that the first cylindrical member may telescope into and out of the second cylindrical member, a groove in the outer surface of the first cylindrical member, said groove being in the configuration of a V, and an inwardly directed stud on the inner surface of the second cylindrical member, said stud co-fitting with the groove, said stud and said groove coacting to control the movement of the first and second cylindrical members, said movement being controlled longitudinal rotational movement of the two cylindrical members with respect to each other.

2. A medical instrument having a movable platform and a base, said movable platform having a first cylindrical member, said base having a second cylindrical member, the first cylindrical member having an outside diameter slightly less than the inside diameter of the second cylindrical member so that the first cylindrical member may telescope into and out of the second cylindrical member, a groove in the outer surface of the first cylindrical member, said groove being in the configuration of a V, and an inwardly directed stud on the inner surface of the second cylindrical member, said stud co-fitting with the groove, said stud and said groove coacting to control the movement of the first and second cylindrical members, said movement being controlled longitudinal rotational movement of the two cylindrical members with respect to each other, a cam follower on the first cylindrical member and a cam associated with the second cylindrical member, and means to move the cam so as to raise the cam follower and the first cylindrical member with respect to the second cylindrical member.

3. A medical instrument having a movable platform and a base, said movable platform having a first cylindrical member, said base having a second cylindrical member, the first cylindrical member having an outside diameter slightly less than the inside diameter of the second cylindrical member so that the first cylindrical member may telescope into and out of the second cylindrical member, a groove in the outer surface of the first cylindrical member, said groove being in the configuration of a V, and an inwardly directed stud on the inner surface of the second cylindrical member, said stud co-fitting with the groove, said stud and said groove coacting to control the movement of the first and second cylindrical members, said movement being controlled longitudinal rotational movement of the two cylindrical members with respect to each other, a block, and means to move the block between the inner part of the first cylindrical member and the second cylindrical member so as to limit the inward telescoping movement of the first cylindrical member with respect to the second cylindrical member.

4. A medical instrument having a movable platform and a base, said movable platform having a first cylindrical member, said base having a second cylindrical member, the first cylindrical member having an outside diameter slightly less than the inside diameter of the second cylindrical member so that the first cylindrical member may telescope into and out of the second cylindrical member, a groove in the outer surface of the first cylindrical member, said groove being in the configuration of a V, and an inwardly directed stud on the inner surface of the second cylindrical member, said stud co-fitting with the groove, said stud and said groove coacting to control the movement of the first and second cylindrical members, said movement being controlled longitudinal rotational movement of the two cylindrical members with respect to each other, a bearing plate on one of the cylindrical members, a plunger associated with the other cylindrical member, and means to vary the degree of friction between the bearing plate and the plunger so as to vary the pressure required to move one cylindrical member with respect to the other cylindrical member.

5. The method of adjusting subluxations of the upper members of the cervical vertebrae comprising (a) positioning the side of the head of a patient against a movable platform of a headrest having a fixedly mounted base, a movable platform, and means for constraining said platform to a combined rotational movement on an axis perpendicular to and within said platform and a translational movement along said axis, and (b) applying a force to the head of the patient while maintaining the head in contact with the platform to rotate the patient's head and condyles on said axis relative to the atlas and to shift the condyles laterally relative to the atlas.

References Cited in the file of this patent

UNITED STATES PATENTS

| | | |
|---|---|---|
| 978,760 | Langworthy | Dec. 13, 1910 |
| 1,386,901 | Schreiner | Aug. 9, 1921 |
| 1,527,754 | Simon | Feb. 24, 1925 |
| 2,078,159 | Redding | Apr. 20, 1937 |
| 2,727,510 | Thompson | Dec. 20, 1955 |
| 2,886,029 | Thompson | May 12, 1959 |

OTHER REFERENCES

The Art of Chiropractic, by Ralph W. Stevenson, publisher Palmer School of Chiropractics in Davenport, Iowa, 1927 (pages 6–11 and 51–57 relied upon).